(12) United States Patent
Rösch

(10) Patent No.: US 8,956,058 B2
(45) Date of Patent: Feb. 17, 2015

(54) DEVICE FOR RELEASING A TRANSCEIVER FIXED IN A HOUSING VIA A CONNECTION FROM THE HOUSING

(75) Inventor: Werner Rösch, Blumberg (DE)

(73) Assignee: MC Technology GmbH, Blumberg (DE)

( * ) Notice: Subject to any disclaimer, the term of this patent is extended or adjusted under 35 U.S.C. 154(b) by 874 days.

(21) Appl. No.: 12/769,950

(22) Filed: Apr. 29, 2010

(65) Prior Publication Data

US 2010/0284657 A1 Nov. 11, 2010

(30) Foreign Application Priority Data

May 7, 2009 (DE) .......................... 10 2009 020 188

(51) Int. Cl.
| | | |
|---|---|---|
| *G02B 6/36* | (2006.01) | |
| *G02B 6/42* | (2006.01) | |
| *B23P 19/00* | (2006.01) | |
| *B25B 7/12* | (2006.01) | |
| *B67B 7/00* | (2006.01) | |
| *G02B 6/38* | (2006.01) | |

(52) U.S. Cl.
CPC ............ *G02B 6/4246* (2013.01); *G02B 6/4201* (2013.01); *G02B 6/3898* (2013.01)
USPC ................... 385/92; 29/764; 81/3.44; 81/302

(58) Field of Classification Search
CPC .................................................... G02B 6/3898
See application file for complete search history.

(56) References Cited

U.S. PATENT DOCUMENTS

| | | | |
|---|---|---|---|
| 6,556,445 B2* | 4/2003 | Medina .......................... | 361/728 |
| 6,570,768 B2* | 5/2003 | Medina .......................... | 361/747 |
| 7,020,376 B1 | 3/2006 | Dang et al. | |
| 7,320,551 B1 | 1/2008 | Moore et al. | |
| 7,507,037 B2* | 3/2009 | Yang et al. ....................... | 385/92 |
| 8,517,616 B2* | 8/2013 | Yi .................................. | 385/92 |
| 2002/0093796 A1* | 7/2002 | Medina .......................... | 361/728 |
| 2002/0142649 A1* | 10/2002 | Baugh et al. ................... | 439/532 |
| 2003/0142917 A1* | 7/2003 | Merrick .......................... | 385/53 |
| 2009/0188106 A1* | 7/2009 | Wang et al. ..................... | 29/764 |
| 2010/0284657 A1* | 11/2010 | Rosch ............................. | 385/92 |

FOREIGN PATENT DOCUMENTS

| | | |
|---|---|---|
| CN | 201114063 Y | 8/2007 |
| WO | WO2007/022207 A2 | 2/2007 |

OTHER PUBLICATIONS

DE Office Action Feb. 8, 2010 for 10 2009 020 188.2 and translation citing the references included (9 pages).

* cited by examiner

*Primary Examiner* — Rhonda Peace
(74) *Attorney, Agent, or Firm* — Andrew F. Young, Esq.; Lackenbach Siegel, LLP

(57) ABSTRACT

The invention concerns a device for releasing a transceiver, fixed in a housing via a connection, from the housing, wherein the device is releasably connectable and insertable into a plug contour of the transceiver via first means and wherein the device has second means for releasing the connection between the transceiver and the housing.

19 Claims, 7 Drawing Sheets

DEVICE FOR RELEASING A TRANSCEIVER FIXED IN A HOUSING VIA A CONNECTION FROM THE HOUSING

CROSS REFERENCE TO RELATED APPLICATIONS

This application claims priority from German Patent Application Serial No. 10 2009 020 188.2-34, filed May 7, 2009, the entire contents of which is herein incorporated fully by reference.

FIGURE FOR PUBLICATION

FIG. 1.

BACKGROUND OF THE INVENTION

1. Field of the Invention

The present invention relates to a device for releasing a transceiver fixed in a housing via a connection from the housing. More specifically, the present invention relates to small form factor pluggable optical transceivers which can be releasably locked within a housing and can be released via an external connection having first and second releasing means for causing the transceiver to be released.

2. Description of the Related Art

The related art involves so-called "transceivers," i.e., combinations of a transmitter and a receiver configured as a structural unit. Optical transceivers are especially familiar, which transfer light injected by optical waveguides into an electrical signal and/or transfer a received electrical signal into light, which can be extracted by optical waveguides. The known transceivers are often pluggable in design and so have the benefit of being quickly and easily replaced from the device, depending on the application, and thus can be adapted to the requirements, to especially the optical relations such as diameter of the optical waveguide or cable length.

Moreover, so-called SFP (small form-factor pluggable) transceivers are known, being distinguished by their small size. SFP transceivers are known that have an LC plug (a small form factor optical connector) for the optical connections and printed circuit edge contacts for the electrical connection. Such transceivers have a rectangular housing, which after being inserted are locked in a metal cage mounted on a circuit board. To loosen the locking, the transceivers have a strap, a stirrup or a lever, and when the strap, the stirrup or the lever is operated, the locking is released and the transceiver can be pulled out from the appliance on the strap, the stirrup or the lever. One such transceiver is found, for example, in WO2007/022207 A2.

When known transceivers are supposed to be used in appliances that are dust or water proof, the transceivers have to be mounted through an appropriately sealed passageway in the appliance housing. To replace the transceiver, the appliance housing has to be opened. WO2007/022207 A2 discloses a transceiver which can also be released from the housing from the outside. But the transceiver described there also has a lever, a stirrup or a strap on which it can be pulled out from the appliance. Such a transceiver with a lever, a stirrup or a strap has a large size, however, so that it cannot be used with known protective housings for LC plugs in appliances that are supposed to be dust or waterproof.

Therefore, the problem to be solved is to make it possible to release a transceiver locked in a housing from outside the device, where in particular a small size of the transceiver should be made possible.

What is not appreciated by the prior art is that transceivers having a lever, a stirrup or a strap as described hereinabove are of a relatively large size, however, so that they cannot be used with known protective housings for LC plugs in appliances that are supposed to be dust or water proof.

Accordingly, there is a need for an improved device for releasing a transceiver fixed in a housing via a connection from the housing.

ASPECTS AND SUMMARY OF THE INVENTION

An aspect of the present invention is to provide a device for releasing a transceiver fixed in a housing via a connection from the housing which has first means by which the device can be releasably connected to the transceiver; and, furthermore, it has second means for releasing the connection between the transceiver and the housing. Thus, this device can be connected to the transceiver, which is mounted in the housing, but which is at least partly accessible from the outside of the appliance housing, and furthermore the connection between the transceiver and the housing is released so that with the help of the device the transceiver can be pulled out from the housing without having to open the device housing. The connection between the device and the transceiver can then be released once again. In this way, even with dust and water proof appliance housings the transceiver can be quickly and easily replaced from outside the appliance.

The connection between the transceiver and the device can be configured as a clamp connection. Preferably, the connection between the transceiver and the housing is configured as a locking connection, since a locking connection enables an especially reliable releasable connection.

According to a preferred embodiment of the invention, the device can be releasably inserted into a plug contour of the transceiver via the first means. Thus, this device can be inserted into the plug contour of the transceiver, which is mounted in the housing and from which therefore the plug contour is accessible from outside the device housing.

The first means can be configured as a clamping device or as a pliers-type gripping device. Especially preferably, however, the first means have a locking contour for snapping into the plug contour of the transceiver, so that the device is locked in the transceiver and a reliable connection is produced between the device and the transceiver. After the transceiver is pulled out from the housing, the device can again be pulled away from the transceiver by releasing the connection between the device and the transceiver.

Especially preferably, the first means are configured as a counterplug to the plug contour of the transceiver, so that the device locks in the transceiver like the corresponding plug. Preferably, the first means are configured as an LC plug, since the known transceivers often have an LC plug at the optical side.

Another aspect of the present invention is to provide an embodiment wherein, the second means are configured as a wedge, with which it is possible in an especially easy way to release the connection, especially a locking connection, between the transceiver and the housing and pull the device with the transceiver out from the housing, without the connection, especially the locking connection, between transceiver and housing becoming reengaged.

Advantageously, the second means are configured as a hook element, which engages in particular with a strap arranged on the transceiver or a lever arranged on the transceiver, so that when the device is pulled out the connection, especially the locking connection, between the transceiver and the housing is easily released.

Basically, it is possible for the first means and the second means of the device to move relative to each other, so that, for example, after inserting the device into the plug contour of the transceiver, the second means can be operated separately in order to release the connection between the transceiver and the housing, or also a releasing of the connection between the transceiver and the housing first occurs through the second means and then the first means are inserted into the plug contour. According to an especially preferred embodiment of the invention, the first means and the second means are, however, arranged relative to each other on the device so that when the first means are inserted into the plug contour of the transceiver at the same time the connection between the transceiver and the housing is released by the second means, enabling an especially easy handling of the device. According to an alternative preferred embodiment of the invention, after connecting the device to the transceiver via the first means the connection between the transceiver and the housing is released by the second means when pulling out the device. This also enables an especially easy handling of the device.

According to another aspect of the present invention, the first means at the same time constitute the second means.

In another aspect of the present invention, the device is configured as a single piece, to enable a simple and economical production process.

Advantageously, the device is made by the plastic injection molding process, which enables a simple and economical production process.

In another aspect of the present invention, the transceiver is configured as an optical transceiver, especially as an SFP transceiver.

The above, and other aspects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
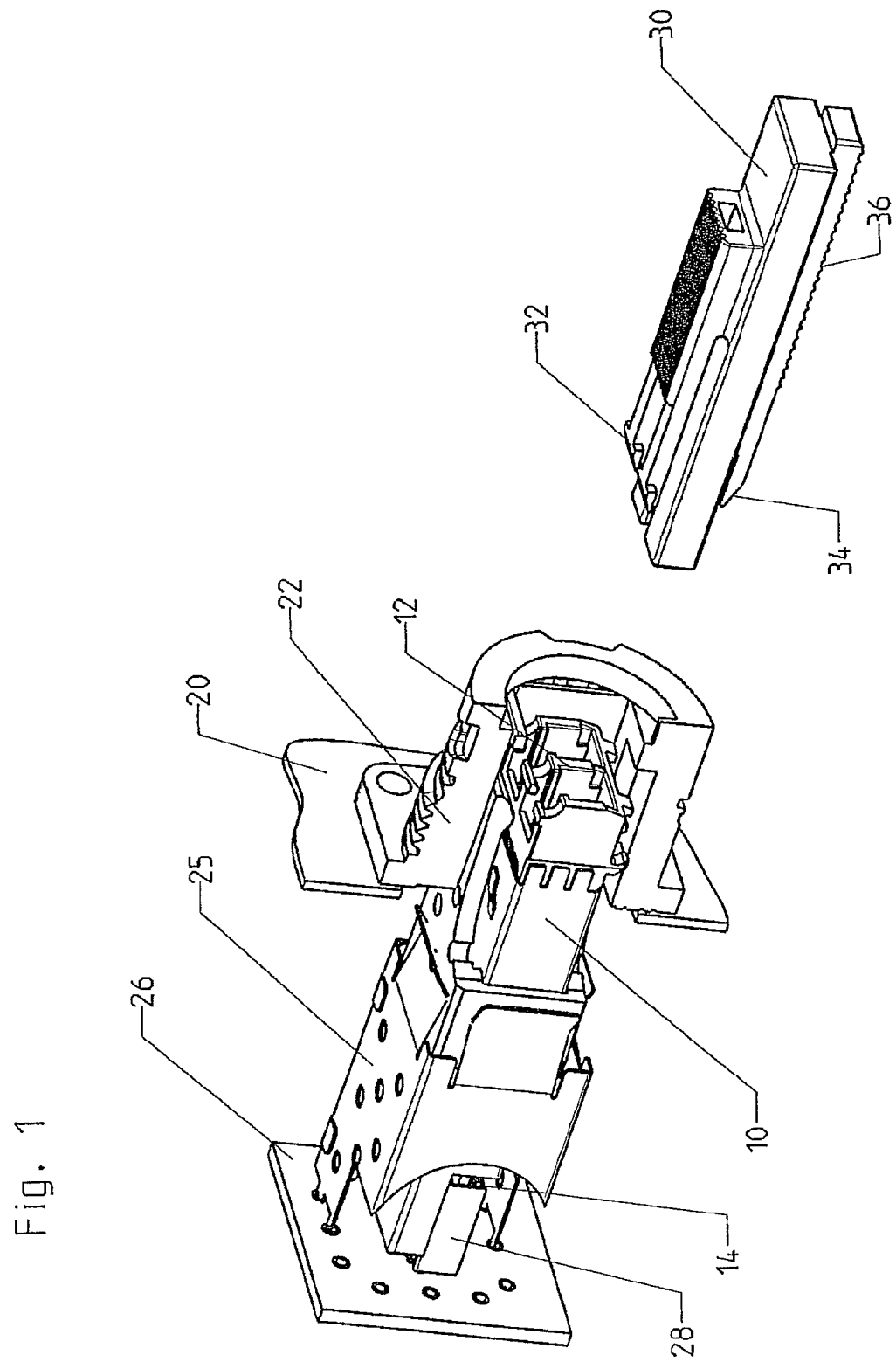
FIG. 1 is a partially sectioned perspective representation of a transceiver built into an appliance with the releasing device of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 2:
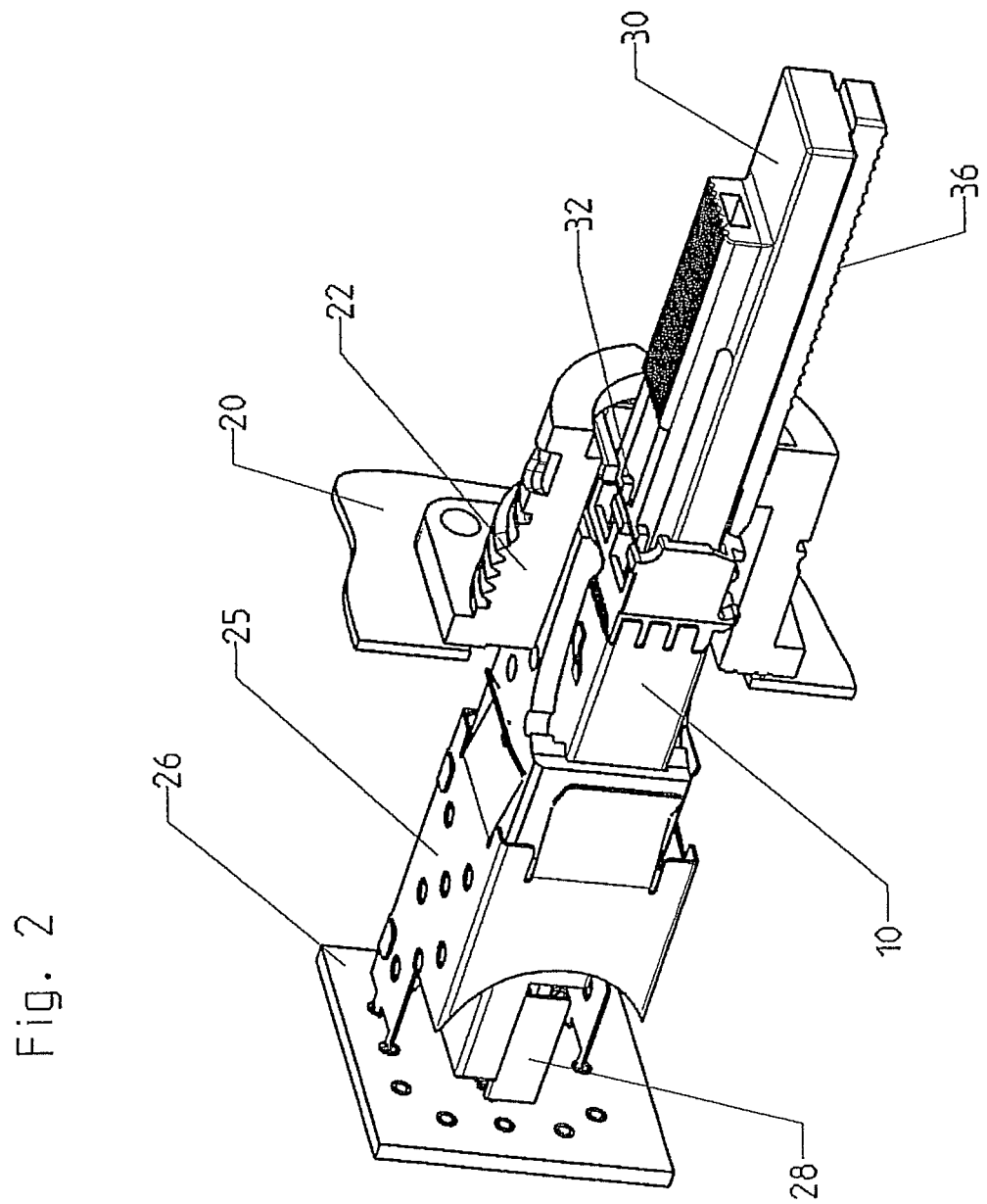
FIG. 2 is a partially sectioned perspective representation of the transceiver according to FIG. 1 with the releasing device partially inserted.
Figure 3:
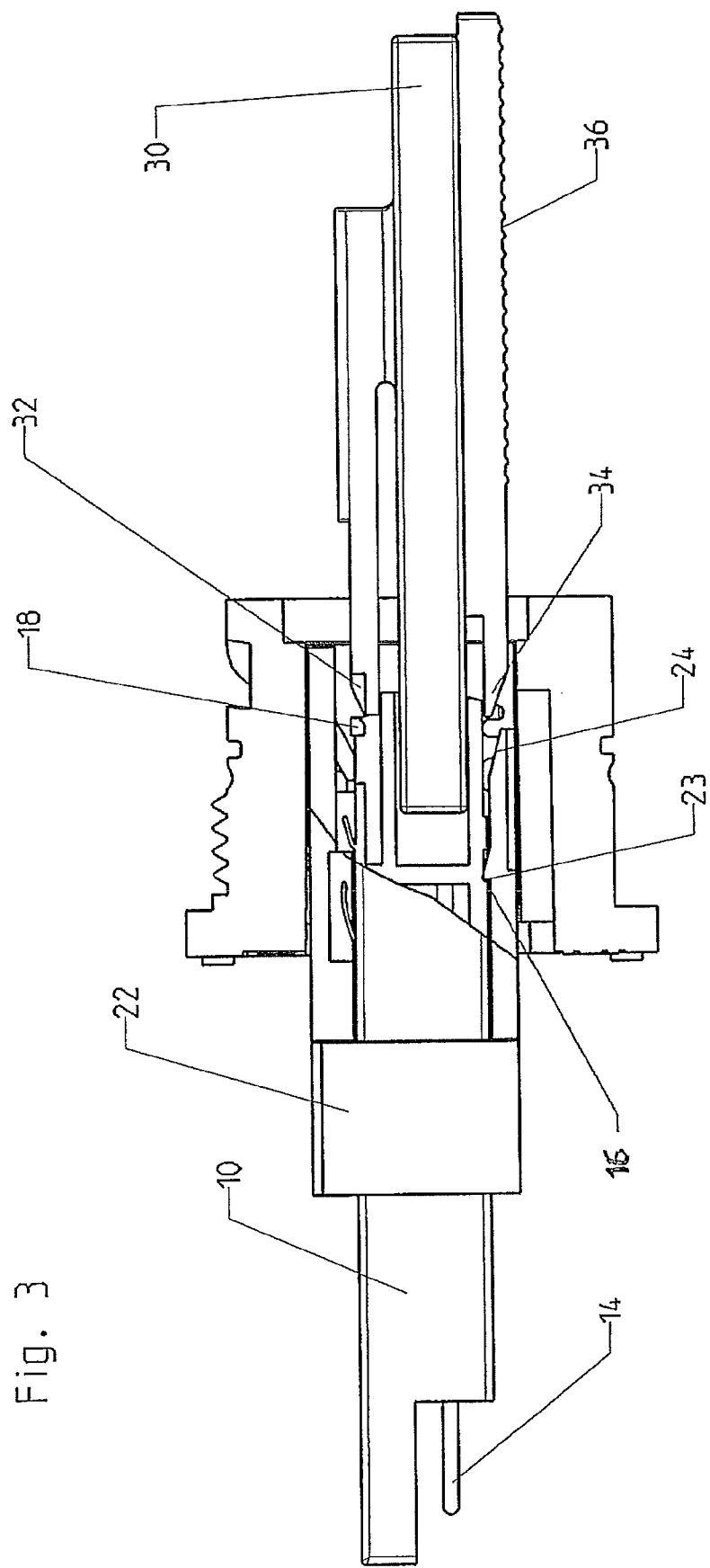
FIG. 3 is a side view of the transceiver according to FIG. 2, installed in an appliance with the partially inserted releasing device.
Figure 4:
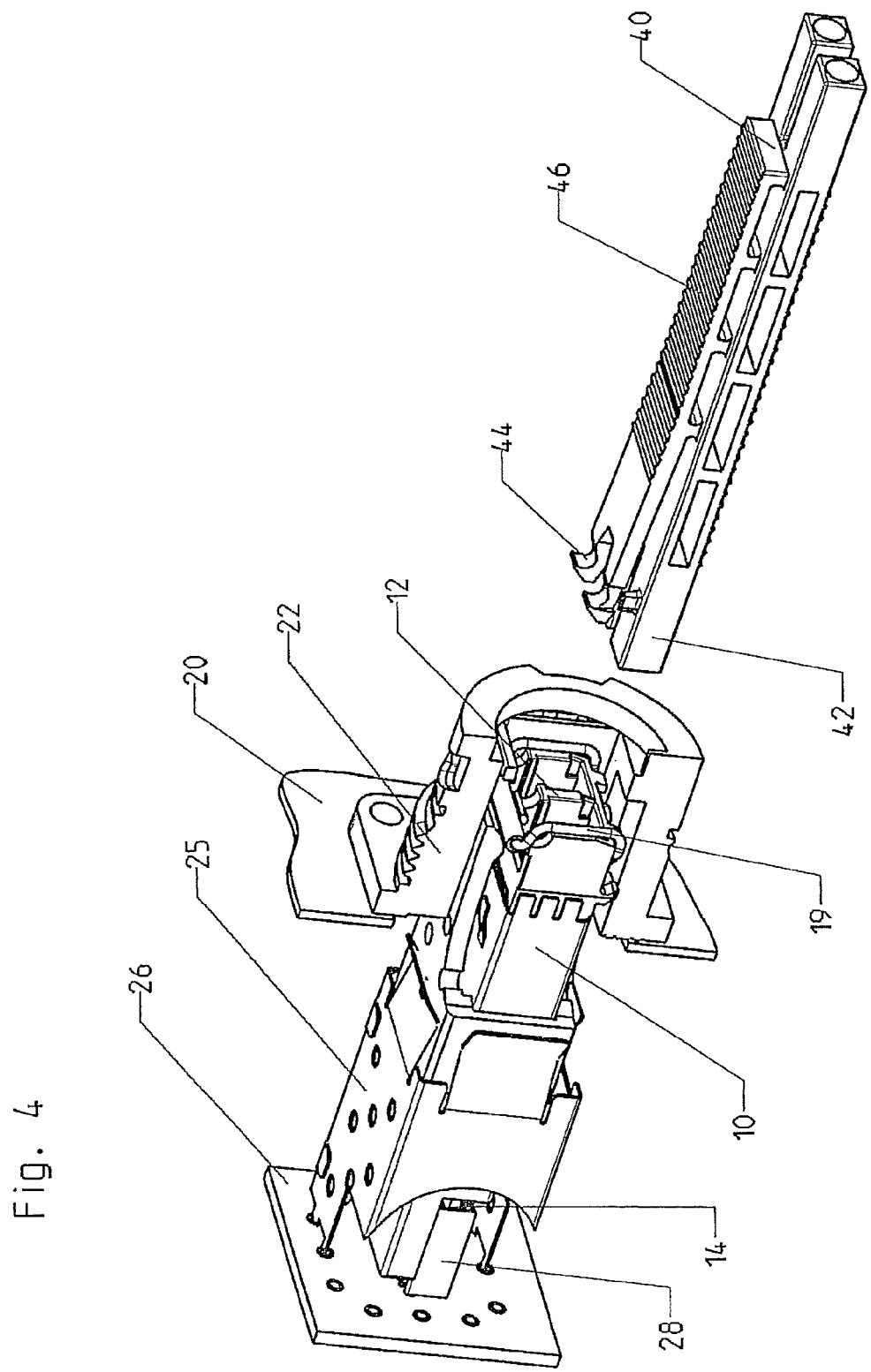
FIG. 4 is a partially sectioned perspective representation of a transceiver built into an appliance with the non-inserted releasing device according to alternative embodiment of the present invention.
Figure 5:
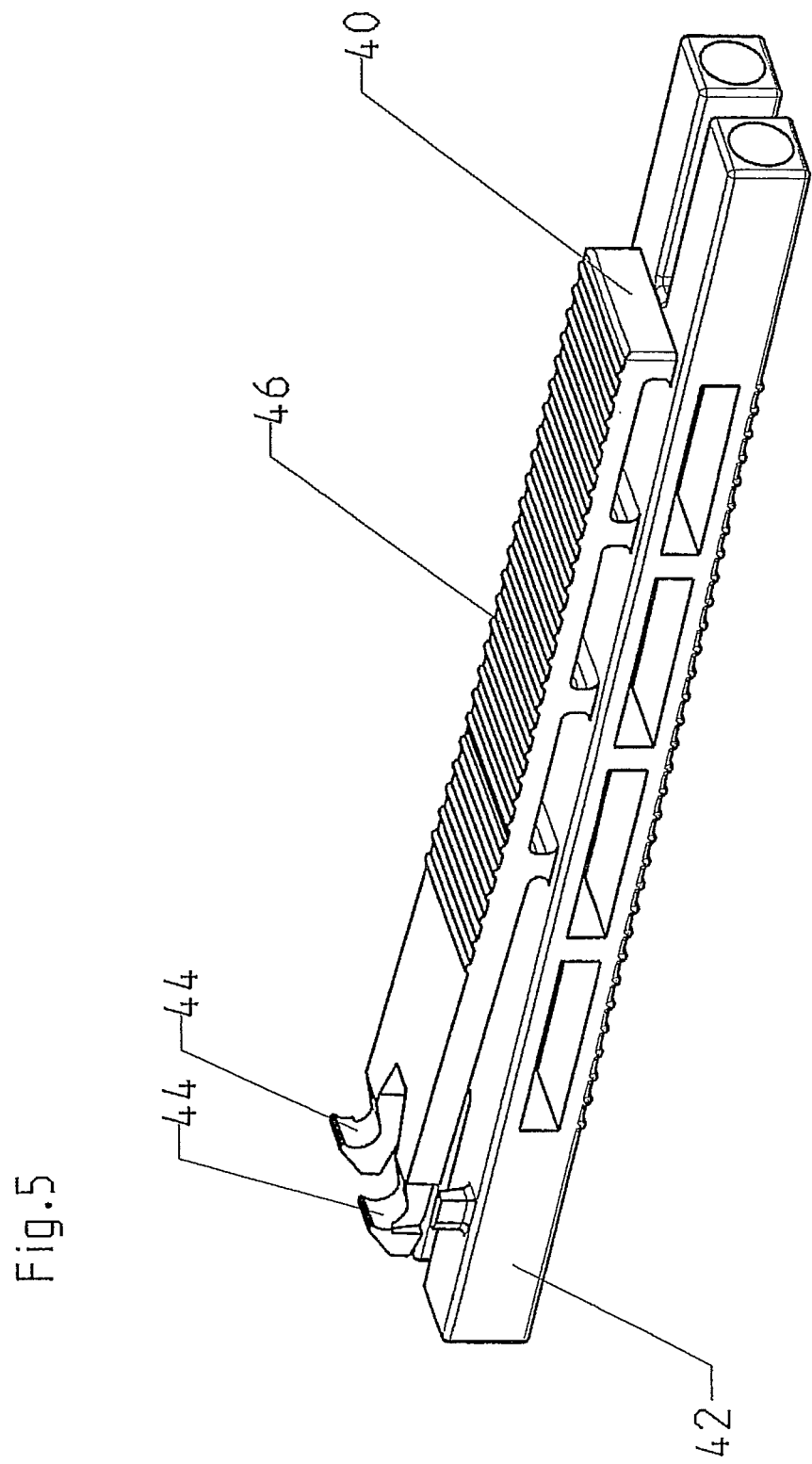
FIG. 5 is a perspective representation of the device according to FIG. 4, shown in magnified view.

FIGS. 1 through 3 show various representations of a first sample embodiment, wherein for better visibility not all reference numbers are given in all figures. The same reference numbers always denote the same parts.

FIGS. 1 through 3 show a transceiver 10, having a rectangular oblong housing 22, in which a transmitter and a receiver are arranged. The transceiver 10, in a preferred embodiment, is configured especially as an optical transceiver, and, in particular, an SFP transceiver.

The transceiver 10 has a plug contour 12 for the optical connection, which is configured in particular as an LC plug contour. For connection on the electrical side, the transceiver 10 has at least one printed circuit edge contact 14 (see FIG. 3), which can be inserted in particular into a socket 28 arranged on a circuit board 26.

The transceiver 10 is led in a screen plate 25 mounted on the circuit board 26 and a protective housing 22 adjoining the screen plate 25. The transceiver 10 is mounted via the protective housing 22 in a housing 20 of an appliance, while for better visibility the housing 20 is shown only in a segment in the figures. The protective housing 22 seals the transceiver 10 against the housing 20 of the appliance and in particular makes sure that the appliance is dust or water proof.

The plug contour 12 of the transceiver 10 is accessible from the outside of the housing 20, in order to insert the corresponding plug into the plug contour 12. The transceiver 10 has a locking contour 16 on its housing, which when the transceiver 10 is inserted into the protective housing 22 and the screen plate 25 interlocks with a locking contour 23 arranged in the protective housing 22. By this locking connection, the transceiver 10 is securely fixed in the protective housing 22.

To allow for pulling the transceiver 10 out from the protective housing 22 from outside the housing 20, according to a first sample embodiment a device 30 is provided for releasing the transceiver 10 fixed in the housing 20 via the locking connection between the locking contour 23 of the protective housing 22 and the locking contour 16 of the transceiver 10 from the housing 20, which can be inserted from outside the housing 20 into the plug contour 12 of the transceiver 10. The device 30 has a locking contour 32, which forms a releasable locking connection with the plug contour 12, especially with a locking contour 18 of the plug contour 12, of the transceiver 10. The locking contour 32 forms first means by which the device 30 can be releasably connected to the transceiver. In particular, the device 30 has a structure complementary to the plug contour 12 of the transceiver 10 or a structure corresponding to the plug which can be inserted into the plug contour 12 of the transceiver 10 and it is configured for example as an LC plug.

Furthermore, the device 30 has, as second means for releasing the locking connection between the transceiver 10 and the housing 20, a wedge 34, which is arranged on the device 30 so that, when the device 30 is shoved into the plug contour 12 of the transceiver 10 and the locking contour 32 of the device 30 engages with the locking contour 18 of the plug contour 12 of the transceiver 10, it makes possible a releasing of the locking connection between the transceiver 10 and the protective housing 22 that is formed by the locking contour 23 of the protective housing 22 and the locking contour 16 of the transceiver 10. For this, an entry bevel 24 is arranged on the protective housing 22, along which the wedge 34 of the device 30 slides when the device 30 is shoved into the plug contour 12 of the transceiver 10, thereby disengaging the locking connection between the locking contour 23 of the protective housing 22 and the locking contour 16 of the transceiver 10. Since the connection between the transceiver 10 and the protective housing 22 is released in this way, it is possible it is possible to pull the transceiver 10 out from the protective housing 22 and the housing 20 of the appliance, including the transceiver 10 held on the device 30 by the locking connection between the locking contour 32 of the device 30 and the locking contour 16 of the transceiver 10. The transceiver 10 can then be pulled off from the device 30 by releasing the locking connection between the locking contour 32 of the device 30 and the locking contour 16 of the transceiver 10. In this way, a simple and fast replacement of the transceiver 10 from the housing 20 is made possible, without having to open up the housing 20.

In particular, by using the device 30, it is possible to omit the lever or stirrup or strap otherwise present in known transceivers 10, especially SFP transceivers, and in this way outfit the transceiver 10 with a small size. Thus, in particular, the transceiver 10 has no lever, no stirrup and no strap by which the locking of the transceiver in the protective housing can usually be released and by which the transceiver can be pulled out of the appliance in the case of the known appliances.

For easy and better handling, the device 30 has a surface structure 36, which ensures a firm grip when pulling the device 30 out, including the transceiver 10 locked to it, from the housing 20.

The device 30 is configured as a single piece, on the one hand to enable an economical manufacturing process. On the other hand, this will ensure in easy manner that the locking contour 32 and the wedge 36 are arranged relative to each other so that when the device 30 locks into the plug contour 12 of the transceiver 10, at the same time the wedge releases the locking connection between the transceiver 10 and the housing 20. The manufacture of the device 30 occurs, in particular, by the plastic injection molding process.

FIGS. 4 to 7 show various representations of a second sample embodiment, wherein for better visibility not all reference numbers are given in all figures. The same reference numbers always denote the same parts, especially also the same parts of the first sample embodiment.

The arrangement of the transceiver 10 in the housing 20 and the configuration of the locking connection between the transceiver 10 and the housing 20 is as described in the first sample embodiment. A difference consists in that the transceiver in the second sample embodiment additionally has a stirrup 19, by means of which the locking connection between the transceiver 10 and the housing 20 in familiar transceivers 10 can be released after opening the housing 20.

To allow for pulling the transceiver 10 out from the protective housing 22 from the outside of the housing 20, according to the second sample embodiment a device 40 is provided for releasing the transceiver 10, fixed in the housing 20 by the locking connection between the locking contour 23 of the protective housing 22 and the locking contour 16 of the transceiver 10, from the housing 20, which can be brought to engage with the transceiver from outside the housing 20. The device 40, in particular, is configured so that it makes it possible to grab the stirrup 19 of the transceiver 10 from outside the housing 20 and operate it so that the locking connection between the transceiver 10 and the housing 20 is released.

The device 40 has a contour 32 which can be introduced into the plug contour 12 of the transceiver 10. The contour 32, however, does not form a releasable connection, but merely serves for positioning and stabilizing the device 40 relative to the transceiver 10. In particular, the contour 32 has a structure complementary to the plug contour 12 of the transceiver 10.

Figure 6:
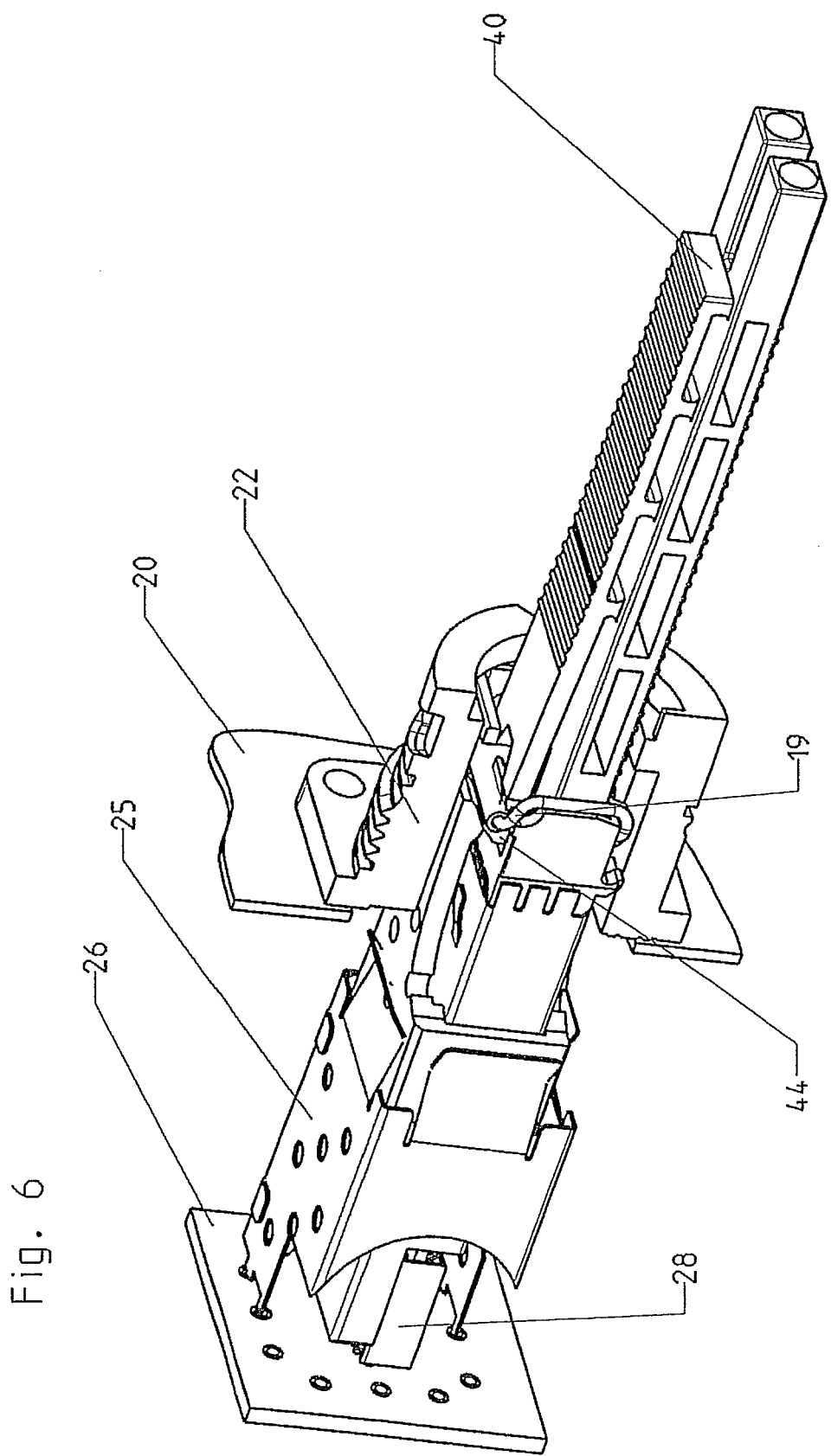
FIG. 6 is a partially sectioned perspective representation of the transceiver according to FIG. 4, with the releasing device inserted.
Figure 7:
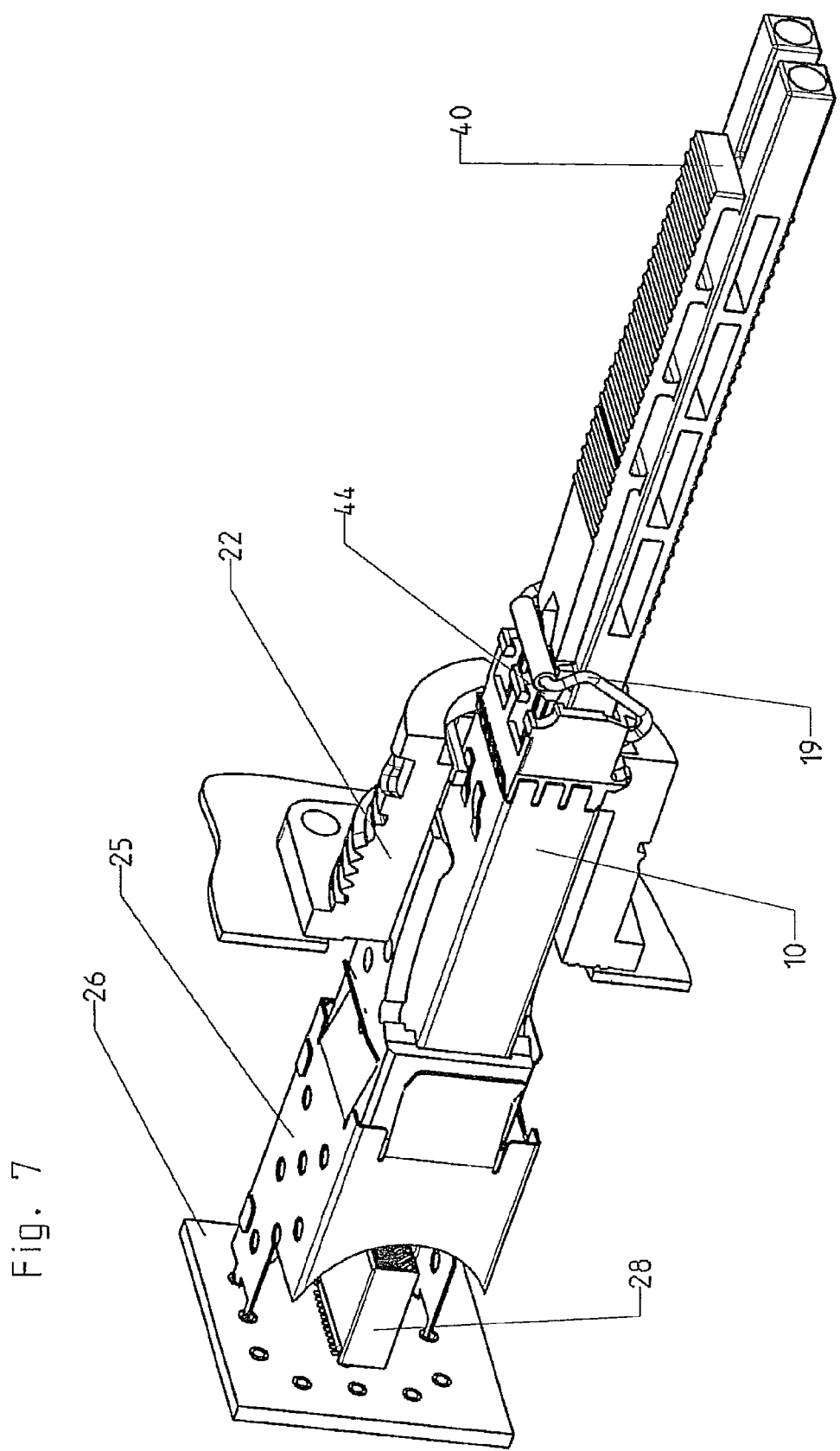
FIG. 7 is a side view of the transceiver according to FIG. 4, installed in an appliance with the releasing device partially pulled out.

Furthermore, the device 40 has two hook elements 44, which are arranged such on the device 40 that they engage with the stirrup 19 of the transceiver 10 when the device 40 is shoved into the plug contour 12 of the transceiver 10 (see FIG. 6). Of course, only one hook element 44 can also be used. The hook elements 44 thus constitute a releasable connection between the device 40 and the transceiver 10 and thus form, in particular, first means for the releasable connection of the device 40 with the transceiver. When the device 40 is pulled out, the stirrup 19 of the transceiver is grabbed and activated by the hook elements 44, in particular, it is swiveled in the direction of pulling (see FIG. 7), while the locking connection between the transceiver 10 and the housing 20 is released, since the transceiver 10 is lifted by the stirrup 19 and the locking connection arranged on the underside of the transceiver 10 between the transceiver 10 and the protective housing 22, which is formed by the locking contour 23 of the protective housing 22 and the locking contour 16 of the transceiver, is disengaged.

The hook elements 44 thus also constitute the second means for releasing the locking connection between the transceiver 10 and the housing 20. Since in this way the connection between the transceiver 10 and the protective housing 22 is released, it is possible to pull out the transceiver 10 from the protective housing 22 and the housing 20 of the appliance, including the transceiver 10 held on the device 40 by the hook elements 44 of the device 40 and the stirrup 19 of the transceiver 10. The transceiver 10 can then be pulled off from the device 40 by releasing the connection between the hook elements 44 of the device 40 and the stirrup 19 of the transceiver 10. In this way, a simple and fast replacement of the transceiver 10 from the housing 20 is made possible, without having to open up the housing 20.

For easy and better handling, the device 40 has a surface structure 46, which ensures a firm grip when pulling the device 40 out, including the transceiver 10 locked to it, from the housing 20. The device 40 is configured as a single piece, on the one hand to enable an economical manufacturing process. On the other hand, this will ensure in easy manner that the locking contour 42 and the hook elements 44 are arranged relative to each other so that when the contour 42 of the device 30 is introduced locks into the plug contour 12 of the transceiver 10, the hook elements 44 engage the stirrup 19, so that afterwards when the device 40 is pulled out the locking connection between the transceiver 10 and the housing 20 is released. The manufacture of the device 40 occurs, in particular, by a plastic injection molding process.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A device for releasing a transceiver fixed in a housing via a connection from said housing,
wherein said device is releasably connectable to said transceiver via first releasing means and wherein said device has second means for releasing said connection between said transceiver and said housing,
wherein said device can be releasably connected and inserted into a plug contour of said transceiver via said first releasing means,
wherein said first releasing means is configured as a counterplug to said plug contour of said transceiver,
wherein said second releasing means is configured as a wedge arranged on said device such that, when said device is inserted into said plug contour of said transceiver, said first releasing means engages with said plug contour, and
wherein after connecting said device to said transceiver via said first releasing means, the locked inter-connection between said transceiver and said housing is released by said second releasing means when pulling out said device.

2. The device according to claim 1, wherein said connection between said transceiver and said housing is configured as a locking connection.

3. The device according to claim 1, wherein said first releasing means has a locking contour for snapping into said plug contour of said transceiver.

4. The device according to claim 1, wherein said first releasing means are configured as an LC plug.

5. The device according to claim 1, wherein said second means is configured as a hook element.

6. The device according to claim 1, wherein said first releasing means and said second releasing means can move relative to each other, so that when inserting said first releasing means into said plug contour of said transceiver, the connection between said transceiver and said housing is released by said second releasing means.

7. The device according to claim 1, wherein said first releasing means at the same time constitutes said second releasing means.

8. The device according to claim 1, wherein said device is configured as a single piece.

9. The device according to claim 1, wherein said device is made by the plastic injection molding process.

10. The device according to claim 1, wherein said transceiver is configured as an optical transceiver.

11. The device according to claim 1, wherein said transceiver is configured as an SFP transceiver.

12. A transceiver system for converting light into an electrical signal, said transceiver system comprising:
(a) a transceiver releasably mounted in a housing via a connection from said housing;
(b) a releasing device for releasing said transceiver from said housing via a connection from said housing, said device further comprising:
(i) first releasing means for releasably connecting said device to said transceiver by inserting said device into a plug contour of said transceiver; and
(ii) second releasing means for releasing said connection between said transceiver and said housing,
wherein said first releasing means is configured as a counterplug to said plug contour of said transceiver, and
wherein said second releasing means is configured as a wedge arranged on said device such that, when said device is inserted into said plug contour of said transceiver, said first releasing means engages with said plug contour, and
wherein after connecting said device to said transceiver via said first releasing means, the locked inter-connection between said transceiver and said housing is released by said second releasing means when pulling out said device.

13. The transceiver system of claim 12, wherein said first releasing means has a locking contour for snapping into said plug contour of said transceiver.

14. The transceiver system of claim 12, wherein said first releasing means are configured as an LC plug.

15. A device for releasing a transceiver fixed in a housing via a connection from said housing, wherein said transceiver is configured as an SFP optical receiver, said device further comprising:
(a) a hook element for releasably connecting said device to said transceiver by inserting said device into a plug contour of said transceiver wherein said connection between said transceiver and said housing is configured as a locking connection and said hook element at the same time is configured to release said transceiver from said locking connection, and
(b) a releasing means configured as a wedge arranged on said device such that, when said device is inserted into said plug contour of said transceiver, said hook element engages with said plug contour,
wherein after connecting said device to said transceiver via said hook element, said locking connection is released by said releasing means when pulling out said device.

16. A device for releasing a transceiver fixed in a housing via a connection from said housing, according to claim 15:
wherein said device is releasably connectable to said transceiver via first releasing means,
wherein said device has second means for releasing said connection between said transceiver and said housing,
wherein said first releasing means is configured as an LC plug,
wherein said first releasing means at the same time constitutes said second releasing means, and
wherein said first releasing means is a locking contour.

17. The device according to claim 16, wherein said connection between said transceiver and said housing is configured as a locking connection.

18. The device according to claim 16, wherein said device is made by a plastic injection molding process.

19. The device according to claim 16, wherein said transceiver is configured as an optical transceiver.

* * * * *